US008168301B2

(12) United States Patent
Onda et al.

(10) Patent No.: US 8,168,301 B2
(45) Date of Patent: May 1, 2012

(54) POLYESTER COMPOSITIONS, METHODS OF MANUFACTURE, AND USES THEREOF

(75) Inventors: Kayoko Onda, Ustunomiya Tochigi (JP); Francois de Bie, Breda (NL); Theodorus Sweegers, Bonn (DE); Rama Konduri, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 717 days.

(21) Appl. No.: 11/558,100

(22) Filed: Nov. 9, 2006

(65) Prior Publication Data
US 2007/0117897 A1    May 24, 2007

(51) Int. Cl.
| B32B 15/08 | (2006.01) |
| B32B 15/04 | (2006.01) |
| B32B 27/06 | (2006.01) |
| B32B 27/30 | (2006.01) |
| H05B 6/00 | (2006.01) |
| C23C 4/08 | (2006.01) |
| C08J 3/22 | (2006.01) |
| C08G 63/60 | (2006.01) |
| C08G 81/02 | (2006.01) |
| C08G 18/67 | (2006.01) |
| C08G 64/16 | (2006.01) |
| C08F 283/02 | (2006.01) |
| C08K 5/04 | (2006.01) |

(52) U.S. Cl. ........ 428/458; 428/457; 428/480; 264/478; 427/455; 524/451; 524/605; 524/513; 524/514; 524/537; 524/611; 524/394; 524/400

(58) Field of Classification Search .................. 523/394; 524/414, 451, 541, 605, 513, 514, 537, 611, 524/394, 400; 427/111, 455; 428/457, 480; 264/478

See application file for complete search history.

(56) References Cited

U.S. PATENT DOCUMENTS

| 3,169,121 | A | * | 2/1965 | Goldberg ...................... 528/173 |
| 4,123,473 | A | * | 10/1978 | Amin et al. .................... 525/439 |
| 4,238,596 | A | | 12/1980 | Quinn |
| 4,238,597 | A | | 12/1980 | Markezich et al. |
| 4,276,208 | A | | 6/1981 | Ogawa et al. |
| 4,414,352 | A | | 11/1983 | Cohen et al. |
| 4,460,731 | A | | 7/1984 | Kochanowski et al. |
| 4,506,043 | A | * | 3/1985 | Ogawa et al. .................. 523/523 |
| 4,664,983 | A | | 5/1987 | Nakamura et al. |
| 4,778,853 | A | * | 10/1988 | Belfoure ........................ 525/67 |
| 4,778,858 | A | | 10/1988 | Ginnings |
| 4,900,610 | A | | 2/1990 | Hochberg et al. |
| 5,039,727 | A | * | 8/1991 | Onishi et al. ................... 524/277 |
| 5,493,483 | A | * | 2/1996 | Lake .............................. 362/346 |
| 5,496,880 | A | * | 3/1996 | Heuseveldt et al. ......... 524/417 |
| 5,563,222 | A | * | 10/1996 | Fukuda et al. ................ 525/437 |
| 5,626,413 | A | | 5/1997 | Ferrell |
| 5,636,413 | A | * | 6/1997 | Berg et al. ................. 24/131 R |
| 5,916,496 | A | * | 6/1999 | Weber ............................ 264/1.9 |
| 2002/0154407 | A1 | * | 10/2002 | Frazier .......................... 359/507 |
| 2003/0022969 | A1 | * | 1/2003 | Gosens et al. ................. 524/101 |
| 2004/0116603 | A1 | * | 6/2004 | Kobayashi et al. ........... 525/166 |
| 2004/0209984 | A1 | * | 10/2004 | Geprags ........................ 524/310 |
| 2006/0100330 | A1 | | 5/2006 | Natarajan et al. |
| 2006/0167162 | A1 | | 7/2006 | Geprags |
| 2008/0132630 | A1 | | 6/2008 | Konduri |

FOREIGN PATENT DOCUMENTS

| JP | 04-053868 | | 2/1992 |
| JP | 2001-064499 | A | 3/2001 |
| KR | 2002-0062403 | | 7/2002 |
| WO | 2004/106405 | A1 | 12/2004 |

OTHER PUBLICATIONS

Richard J. Lewis, Sr. "Hawley's Condensed Chemical Dictionary, 12th Edition", John Wiley & Sons, Inc., New York pp. 931 (1993).*
Fred W. Billmeyer, Jr, "Textbook of polymer Science, 3rd Edition" John Wiley & Sons, Inc., New York pp. 457-459 (1984).*
JP 02-124934; Publication Date: May 14, 1990 (translation of abstract only).
JP 08-208959; Publication Date: Aug. 13, 1996 (translation of abstract only).
JP 11-241006; Publication Date: Sep. 7, 1999 (translation of abstract only).
JP 11-293099; Publication Date: Oct. 26, 1999 (translation of abstract only).
JP 2000-212294; Publication Date: Aug. 2, 2000 (translation of abstract only).
JP 2000-035509; Publication Date: Feb. 2, 2000 (translation of abstract only).
JP 2001-316573; Publication Date: Nov. 16, 2001 (translation of abstract only).
JP 2002-179895; Publication Date: Jun. 26, 2002 (translation of abstract only).
JP 2002-294042; Publication Date: Oct. 9, 2002 (translation of abstract only).
JP 2003-261750; Publication Date: Sep. 19, 2003 (translation of abstract only).
JP 2004-250636; Publication Date: Sep. 9, 2004 (translation of abstract only).
JP 2005-041977; Publication Date: Feb. 17, 2005 (translation of abstract only).
JP 2005-194300; Publication Date: Jul. 21, 2005 (translation of abstract only).
International Search Report and Written Opinion; International Application No. PCT/US2007/076761; International Filing Date Aug. 28, 2007; Date of mailing; Dec. 20, 2007; 13 pages.
KR 2003-0079000, Published Oct. 10, 2003, English Abstract Only, 1p.
"ULTRATALC 609 high purity Montana Talc" Product Literature, 2003, 1p, Specialty Minerals Inc.
Borman, W.F.H., Molecular Weight—Viscosity Relationships for Poly(1,4-butylene Terephthalate); Journal of Applied Polymer Science; 22; pp. 2119-2126; (1978).
Wallach, M. L.; "Viscosity-Molecular Weight Relation and Unperturbed Dimensions of Polyethylene Terephthalate"; Die Makromolekulare Chemie; 103; pp. 19-26; (1967).

* cited by examiner

Primary Examiner — Basia Ridley
Assistant Examiner — Alexander Kollias
(74) Attorney, Agent, or Firm — Cantor Colburn LLP; Diderico van Eyl

(57) ABSTRACT

A composition comprising a combination of a thermoplastic polyester; and 0.2 to 0.7 parts by weight of an alkali metal salt, an alkaline earth metal salt, and/or a $C_{1-12}$ ester of an aliphatic $C_{24-36}$ carboxylic acid, based on 100 parts by weight of the polyester. The compositions are useful for molding parts, such as automotive headlamp reflectors.

28 Claims, No Drawings

POLYESTER COMPOSITIONS, METHODS OF MANUFACTURE, AND USES THEREOF

BACKGROUND OF THE INVENTION

This invention relates to polyester compositions, their method of manufacture, and uses of the compositions, for example as optical reflectors in lighting applications.

Molded items comprising thermoplastic resins have been used for optical reflectors that can be used for automotive headlight extensions and reflectors, for indoor illumination, for vehicle interior illumination and for the like, with vapor deposited films of metal having been formed on the surfaces of said molded items.

Polyester resin is often used for such molded items because of its high thermal and flow properties. However, because the surfaces of the molded items do not ordinarily possess satisfactory gloss or there is roughness in the surfaces, they are treated with primer as an undercoat before vapor deposition of the reflective surface. Such primer treatment adds a processing cost, so improvements are sought so that vapor deposition can be performed directly on the molded item. For this reason, it is necessary to develop resin compositions that can be molded into molded items that have high gloss, and whose metallized (e.g., vapor deposited metal) surfaces do not subsequently become clouded by generated gases, even when heated.

It is thought that direct deposition processing that does not use primers will become the mainstream for the purposes of simplifying manufacturing processes, in addition to economics, and environmental problems. Several polyester resin compositions have been proposed that allow direct vapor deposition.

For example, Japan Unexamined Patent Publication H11-241006 discloses light reflectors with metal directly deposited on molded items made from polyester resin compositions that have modified silicon oil, organophosphorus compound, fine powder filler and organic nucleating agent blended into mixed resin comprising polyalkylene terephthalate resin and polycarbonate resin.

Also, Japan Unexamined Patent Publication 2000-212294 discloses automotive parts made from blending layered silicates, in which organic ions have replaced exchangeable cations present between the layers, into thermoplastic polyester. Japan Unexamined Patent Publication 2001-316573 discloses lamp parts made from compositions comprising an epoxy group-containing substance and reinforcing agent in thermoplastic polyester.

Japan Unexamined Patent Publication 2002-179895 discloses compositions for optically reflecting molded items that have polyalkylene naphthalate in polybutylene terephthalate. Also, Japan Unexamined Patent Publication 2000-35509 discloses a method for manufacturing a reflector comprising molding a resin composition that has polyethylene terephthalate resin and a non fibrous inorganic filler having an average grain size equal to or less than 10 micrometers (µm) into polybutylene terephthalate resin that has less that 50 milliequivalents per kilogram (meq/kg) terminal carboxyl groups, and directly forming optically reflecting metal layer on at least a portion of the molded article. Furthermore, Japan Unexamined Patent Publication 2002-294042 discloses an optical reflector that has an optically reflecting metal layer formed on at least a portion of a molded article made from a composition having lanthanum oxide blended into polyester resin.

However, articles with satisfactory molding characteristics, metal layer adhesion, gloss, etc. cannot be obtained from the compositions disclosed in the above References to. There are four characteristics required for direct vapor deposition of metal layers.

1) Mold shrinkage during molding

If mold shrinkage is high, dimensional stability of the molded article and release from the mold become problems.

2) Good gloss of the surface of the molded item and the absence of adhesion patterns that arise from adhesion to the mold It is necessary that the resin has satisfactory release properties and contains nothing that would cause a loss of gloss.

3) Absence of adhered matter on the molds after lengthy molding times

Because out gassing from the resin composition deposit/sticks to the mold surface and these adhere to the surfaces of the molded articles, the molds must be cleaned every few hours.

4) Absence of cloudiness, rainbow patterns, etc. in the vapor deposited surface even after heating the vapor deposited surface of the molded item.

The conventional technologies published in the above patent References have difficulty in obtaining items that satisfy all four of these characteristics.

This applicant proposed in Japan Unexamined Patent Publication H11-293099, as a composition for reflectors in automotive headlights, resin compositions for direct vapor deposition that contain polyarylate resin and polyester resin that has aliphatic diol residues.

Furthermore, this applicant proposed in Japan Unexamined Patent Publication 2003-261750 polyester resin compositions that possess certain heat distortion temperatures and contain (a) thermoplastic polyester, (b) inorganic filler, (c) 0 to about 400 parts by weight of at least one kind of polycarbonate, and (d) an antistat agent, and the use of these resin compositions for optical reflectors. However, for the compositions disclosed in this reference, undercoating is necessary when they are used for optical reflectors.

There accordingly remains a need in the art for polyester molding composition that have low shrinkage, low residuals on the surface of the article or mold after demolding, good gloss, and good gloss retention after exposure to heat. It would be a further advantage if the compositions could be used in the manufacture of articles having an excellent appearance after metallization without a separate undercoating step.

SUMMARY OF THE INVENTION

Disclosed herein is a composition comprising a combination of a thermoplastic polyester; and 0.2 to 0.7 parts by weight of an alkali metal salt, an alkaline earth metal salt, or a $C_{1-12}$ ester of an aliphatic $C_{24-36}$ carboxylic acid, based on 100 parts by weight of the polyester.

Further disclosed herein is an article formed from the above composition.

Also disclosed is a method of forming an article, comprising shaping, extruding, calendaring, or molding the above composition.

Also disclosed herein is an article comprising a composition comprising a combination of: polyethylene terephthalate, polybutylene terephthalate, or a combination comprising at least one of the foregoing polyesters; and 0.2 to 0.7 parts by weight of an alkali metal salt, an alkaline earth metal salt, or a $C_{1-12}$ ester of an aliphatic $C_{26-36}$ carboxylic acid, based on 100 parts by weight of the polyester, wherein an article molded from the composition has no surface defects visible to the eye on a surface thereof.

Further disclosed herein is a composition, comprising a combination of: polyethylene terephthalate, polybutylene terephthalate, or a combination comprising at least one of the foregoing polyesters; 0.2 to 0.7 parts by weight of an alkali metal salt, an alkaline earth metal salt, or a $C_{1-12}$ ester of an aliphatic $C_{26-32}$ carboxylic acid, based on 100 parts by weight of the polyester; and no filler, wherein an article formed from the composition has a metallized surface, and the metallized surface retains 90% or more of its gloss after heat aging at 150° C. for 1 hour, measured at 20 degrees using a micro tri gloss meter.

A resin composition for optical reflectors is also disclosed, that comprises (a) a thermoplastic polyester, and based on 100 parts by weight of the thermoplastic polyester, (b) 5 to 15 parts by weight polycarbonate, (c) 0.05 to 0.5 parts by weight of a fine powder filler having an average grain size equal to or less than 10 μm, (d) 0.2 to 0.7 parts by weight montanic acid salt or montanic acid ester, and (e) 0.05 to 0.5 parts by weight inorganic phosphorus compound.

DETAILED DESCRIPTION OF THE INVENTION

As the result of diligent investigation in order to solve the above problems, it was discovered that if certain resin compositions are used, optical reflectors can be obtained that satisfy all of the characteristics, and this invention was perfected. In particular, the resin compositions comprise a salt or ester of a long-chain carboxylic acid having from 22 to 32 carbon atoms. A particulate filler, an inorganic phosphorus compound, and/or a colorant is optionally present in the composition.

In a specific embodiment, the resin composition for light reflectors of this invention contains, versus (a) 100 parts by weight thermoplastic polyester, (b) 5 to 15 parts by weight polycarbonate, (c) 0.05 to 0.5 parts by weight of a fine powder filler having an average grain size equal to or less than 10 μm, (d) 0.2 to 0.7 parts by weight montanic acid salt or montanic acid ester as mold release, and (e) 0.05 to 0.5 parts by weight inorganic phosphorus compound.

The inorganic phosphorus compound is preferably phosphate. The optical reflectors of this invention comprise molded items of the above-mentioned compositions. Metal layers can be formed on the above-mentioned optical reflectors without having formed an undercoat in the surface of the molded item.

Molded articles that are molded using the resin compositions of this invention possess little mold shrinkage during molding; the gloss of the molded surfaces is good; there is no residue on the mold after long molding runs; and there is no clouding or rainbow patterns in the vapor deposited surface even when heat is applied to the vapor deposited surface of the molded item.

Because of this, reflectors that are manufactured by direct metallization (vapor deposition/sputtering) using molded items made from the compositions of this invention possess good appearance, heat resistance, and thermal stability. In this way the resin compositions of this invention are particularly suitable as materials for manufacturing reflectors and the like using direct vapor deposition. Also, because the resin compositions of this invention have superior transparency, they can be used as transmitting lenses. Furthermore, because the molding characteristics are good, they can be widely applied in flexible designs.

The ingredients that can be used for compositions of this invention are described below.

(a) Thermoplastic Polyester

Various polyesters can be used as (a) thermoplastic polyesters that can be used in this invention, but thermoplastic polyesters that are obtained by polymerizing bifunctional carboxylic acids and diol ingredients are particularly preferred.

Aromatic dicarboxylic acids, for example, terephthalic acid, isophthalic acid, naphthalene dicarboxylic acid and the like, can be used as these bifunctional carboxylic acids, and mixtures of these can be used as needed. Among these, terephthalic acid is particularly preferred from the standpoint of cost. Also, to the extent that the effects of this invention are not lost, other bifunctional carboxylic acids such as aliphatic dicarboxylic acids such as oxalic acid, malonic acid, adipic acid, suberic acid, azelaic acid, sebacic acid, decane dicarboxylic acid, and cyclohexane dicarboxylic acid; and their ester-modified derivatives can also be used.

As diol ingredients the commonly used ones can be used without difficulty, for example, straight chain aliphatic and cycloaliphatic diols having 2 to 15 carbon atoms, for example, ethylene glycol, propylene glycol, 1,4-butanediol, trimethylene glycol, tetramethylene glycol, neopentyl glycol, diethylene glycol, cyclohexane dimethanol, heptane-1,7-diol, octane-1,8-diol, neopentyl glycol, decane-1,10-diol, etc.; polyethylene glycol; bivalent phenols such as dihydroxydiarylalkanes such as 2,2-bis(4-hydroxylphenyl)propane that can be called bisphenol-A, bis(4-hydroxyphenyl)methane, bis(4-hydroxyphenyl)naphthylmethane, bis(4-hydroxyphenyl)phenylmethane, bis(4-hydroxyphenyl)-(4-isopropylphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)-3,3,5-trimethylcyclohexane, and 2,2-bis(4-hydroxyphenyl)-1,1,1,3,3,3-hexafluoropropane; dihyroxydiarylcycloalkanes such as 1,1-bis(4-hydroxyphenyl)cyclohexane, 1,1-bis(3,5-dichloro-4-hydroxyphenyl)cyclohexane, and 1,1-bis(4-hydroxyphenyl)cyclodecane; dihydroxydiarylsulfones such as bis(4-hydroxyphenyl)sulfone, and bis(3,5-dimethyl-4-hydroxyphenyl)sulfone, bis(3-chloro-4-hydroxyphenyl)sulfone; dihydroxydiarylethers such as bis(4-hydroxyphenyl)ether, and bis(3-5-dimethyl-4-hydroxyphenyl)ether; dihydroxydiaryl ketones such as 4,4'-dihydroxybenzophenone, and 3,3',5,5'-tetramethyl-4,4-diydroxybenzophenone; dihydroxydiaryl sulfides such as bis(4-hydroxyphenyl)sulfide, bis(3-methyl-4-hydroxyphenyl)sulfide, and bis(3,5-dimethyl-4-hydroxyphenyl)sulfide; dihydroxydiaryl sulfoxides such as bis(4-hydroxyphenyl)sulfoxide; dihydroxydiphenyls such as 4,4'-dihydroxyphenyl; dihydroxyarylfluorenes such as 9,9-bis(4-hydroxyphenyl)fluorene; dihydroxybenzenes such as hydroxyquinone, resorcinol, and methylhydroxyquinone; and dihydroxynaphthalenes such as 1,5-dihydroxynaphthalene and 2,6-dihydroxynaphthalene. Also, two or more kinds of diols can be combined as needed.

In a specific embodiment, the polyester is polyethylene terephthalate, polybutylene terephthalate, polyethylene naphthalate, polybutylene naphthalate, polytrimethylene terephthalate, poly(1,4-cyclohexylenedimethylene 1,4-cyclohexanedicarboxylate), poly(1,4-cyclohexylenedimethylene terephthalate), poly(cyclohexylenedimethylene-co-ethylene terephthalate), or a combination comprising at least one of the foregoing polyesters. Polyethylene terephthalate (PET) and polybutylene terephthalate (PBT) are particularly suitable as polyesters that are obtained by the polymerization of these kinds of bifunctional carboxylic acid and diol ingredients.

These thermoplastic polyesters (a) can be produced in the presence or absence of common polymerization catalysts represented by titanium, germanium, antimony or the like; and can be produced by interfacial polymerization, melt polymerization or the like.

Polyester resin compositions of this invention can be a single kind of thermoplastic polyester (a) used alone, or two or more kinds used in combination. Furthermore, copolyesters can also be used as needed. When using two or more kinds of thermoplastic polyesters (a) in combination, combinations of polybutylene terephthalate and polyethylene terephthalate or the like are preferred.

The molecular weight of the thermoplastic polyesters (a) that can be used in this invention is not limited as long as the properties of the molded items are not lost, and need to be optimized according to the kinds of thermoplastic polyesters that are used. However, weight average molecular weights, as measured by GPC and calculated as polystyrene, are preferably 10,000 to 200,000, with 20,000 to 150,000 being particularly suitable. If the weight average molecular weight is within the above range, the mechanical characteristics of the molded items when molded are good, and the mold ability is excellent. If thermoplastic polyesters that have a weight average molecular weight less than 10,000 are used, the mechanical properties themselves of the resins are unsatisfactory. For example, the mechanical characteristics of the molded items are unsatisfactory. On the other hand, if the weight average molecular weight is greater than 200,000, the moldability decreases, for example, the melt viscosity during molding increases.

(b) Polycarbonate

Known aromatic polycarbonates (see, for example, Japan Unexamined Patent Publication S63-215763 and Japan Unexamined Patent Publication H02-124934) that are made using the phosgene method or melt method can be used as polycarbonate (b) in this invention. Polycarbonate is made from a carbonate component and a diphenol component. Phosgene, diphenyl carbonate and the like can be listed as precursors for introducing the carbonate component.

The diphenol ingredient can be, for example, 2,2-bis(4-hydroxyphenyl)propane (also known as bisphenol-A); 2,2-bis(3,5-dibromo-4-hydroxyphenyl)propane; 2,2-bis(3,5-dimethyl-4-hydroxyphenyl)propane; 1,1-bis(4-hydroxyphenyl)cyclohexane; 1,1-bis(3,5-dimethyl-4-hydroxyphenyl)cyclohexane; 1,1-bis(4-hydroxyphenyl) decane; 1,4-bis(4-hydroxyphenyl)propane; 1,1-bis(4-hydroxyphenyl)cyclododecane; 1,1-bis(3,5-dimethyl-4-hydroxyphenyl)cyclododecane; 4,4-dihydroxydiphenylether; 4,4-thiodiphenol; 4,4-dihydroxy-3,3-dichlorodiphenylether; and 4,4-dihydroxy-2,5-dihydroxydiphenylether, etc. These can be used alone or in combination. Also, one can use compounds having 3 or more phenolic hydroxyl groups.

Polycarbonate (b) can also be aromatic copolyester carbonate. These have ester units, that are derived from aromatic diols and aliphatic dicarboxylic acids having 6 to 18 carbon atoms, added to carbonates derived from known aromatic diols. These can be produced according to phosgene and melt methods known for producing aromatic polycarbonates. (See the specifications of U.S. Pat. Nos. 4,238,596, 4,238,597 and 3,169,121.)

The molecular weight of the polycarbonate resin, being the viscosity average molecular weight calculated from the solution viscosity measured using methylene chloride as solvent at 25° C., is 15,000 to 30,000, preferably 16,000 to 25,000.

(c) Finely Powdered Filler

Finely powdered, i.e., particulate fillers (c) that can be used for this invention have average grain sizes less of than 10 μm. Concretely, naturally or artificially produced clay minerals and needle-shaped minerals, for example, mica, potassium titanate whiskers, kaolin, clay, talc, wollastonite, etc., can be used. Among these, talc that has an average grain sizes of equal to or less than 10 μm is preferred.

Including an inorganic filler that has an average grain sizes of equal to or less than 10 μm does not roughen the surface of the molded items, aids the crystallization of the polyester, and increases heat resistance. Other than controlling the moisture content, the methods for manufacturing these are not particularly limited. For example, when producing from natural minerals, the ore is first pulverized with equipment such as a tube mill, hammer mill, micron mill, centrifugal roller type Raymond mill, etc, then, when fine pulverization is needed, dry or wet pulverization can be done with a micron mill, jet pulverizer, Jet-o-Mizer, Micronizer, jet ball pulverizer, stirring grinder (tower mill), shaker mill, colloid mill, etc. Next, these pulverized fillers can be dry or wet classified with equipment such as a cyclone, multirone, micron separator, microplex, cyclone air separator, ultraseparator, jetclone, classiclone, rake classifier, hydrocyclone, water classifier, centrifugal classifier, etc., and the grain size and other properties adjusted.

The adsorbed water content of finely powdered fillers (c) should be controlled to be less than 0.25 weight percent, preferably less than 0.2 weight percent. Methods for adjusting the water content of finely powdered fillers (c) are usually the same methods as for drying them. Because drying times, drying methods, etc. differ by the kind of finely powdered filler (c) used and production method, the water content is optimally selected according to the finely powdered filler (c). If the adsorbed water content in the finely powdered filler (c) is controlled in this way, the melt stability of the resin increases, and articles with good appearance can be molded. It is thought that the finely powdered filler (c), whose adsorbed water content has been controlled, adsorbs moisture from the resin during molding and maintains the appearance of the molded item.

(d) Mold Release

The mold release agent is a salt or an ester of a long chain, aliphatic carboxylic acid having from 24 to 36 carbon atoms, specifically 26 to 36 carbon atoms, more specifically 26 to 32 carbon atoms. In particular, montanic acid salts or montanic acid esters can be used as the mold release of this invention. One can also mix two or more kinds of these montanic acid salts or montanic acid esters.

Suitable salts include metal salts, in particular alkali metal and alkaline earth metal salts. Specific montanic acid salts that can be used as mold releases are sodium montanate, potassium montanate, beryllium montanate, magnesium montanate, calcium montanate, lithium montanate, aluminum montanate, etc. Montanic acids are acid mixtures that have as their primary component aliphatic monocarboxylic acids having 26 to 32 carbon atoms. Also, all or a portion of the montanic acid can be esterified with monovalent alcohols, divalent alcohols, etc.

Specific montanic acid esters are esters of montanic acid with alcohols having 2 to 10 carbon atoms, among these being diols such as ethylene glycol, 1,2- or 1,3-propanediol, 1,3- or 1,4-butanediol, etc.

If these montanic acid salts or esters are used as mold releases, the surfaces of the molded items are smooth, the gloss is superior, and the gloss does not change even when exposed to high temperature. Conventionally, silicone mold releases, ester mold releases and olefinic mold releases such as pentaerythritol tetrastearate, glycerine monostearate, poly alpha-olefin, etc. have been used, but if these are used, it becomes difficult to obtain molded items having superior gloss, and the surface gloss greatly decreases when exposed to high temperature.

Montanic acid salts or esters can be combined with conventionally used mold release agents in this invention, but montanic acid salts or esters are preferably used alone. Also, silicone oil should not be included for this invention. Silicone oil easily becomes gas during molding, contaminates the mold, the contaminants stick to the molded items, and the surface gloss of the molded articles easily degrades.

(e) Inorganic Phosphorus Compound

This invention uses inorganic phosphorus compounds as stabilizers. These inorganic phosphorus compounds are inorganic compounds selected from phosphoric acid, phosphorous acid, and metal salts of phosphoric acid and phosphorous acid; specifically, metal salts of phosphoric acid, such as zinc phosphate, potassium phosphate, sodium phosphate, aluminum phosphate, sodium pyrophosphate, etc., and their hydrates, and the corresponding metal phosphates, can be listed as metal salts of phosphoric acid and phosphorous acid. Among these, phosphate is preferred and zinc phosphate is particularly preferred.

If these sorts of inorganic phosphates are used, out gassing are suppressed without degrading heat resistance, thereby obtaining molded items that have superior surface gloss which does not change even when exposed to heat.

Conventional organophosphorus compounds can be used as stabilizers, but have the problem that organophosphorus compounds give out gassing during continuous molding, contaminate the mold, so that after a certain time, the mold must be cleaned.

Within the limits that the properties of the compositions of this invention are not lost, various added ingredients can be added according to objective, for example, besides (a) thermoplastic polyester, (b) polycarbonate, (c) finely powdered filler, (d) montanic acid salt or montanic acid ester and (e) inorganic phosphorus compound, other stabilizers such as hindered phenols or amines, etc., ultraviolet stabilizers such as benzotriazoles and benzophenones, etc., optical stabilizers such as hindered amines, etc., internal lubricants such as aliphatic carboxylic acid esters, paraffins, polyethylene waxes, etc., fire retardants, fire retarding aids, organic fillers, colorants, etc. can be blended.

Suitable colorants include those known for use in molding compositions, and include inorganic and organic pigments and dyes. Exemplary colorants include metal oxides and oxide-hydroxides, mixed metal oxides, titanates, aluminates, carbonates, iron oxides, chromium oxides, ultramarines and metal sulfides, sulfoselenides, rare-earth sulfides, chromium iron oxides, chromium iron nickel spinel, chromium green, black hematite, bismuth vanadate, chromates, nitrides (including, but not limited to tantalum), iron blue, cobalt and manganese phosphates, europium complexes, and carbon black. Organic colorants include azo dyes, methine dyes, coumarins, pyrazolones, quinophthalones, quinacridones, perinones, anthraquinones, phthalocyanines, perylene derivatives, anthracene derivatives, indigoid and thioindigoid derivatives, imidazole derivatives, napthalimide derivatives, xanthenes, thioxanthenes, azine dyes, polyazaindacenes, benzoxazole, pyrazolines, fluoroscein, benzothiazole, hydroxyflavones, bis(hydroxyflavones), stilbenes, thiophene, rhodamines, and all their derivatives. Combinations of colorants can be used. When present, a colorant is used in an amount of 0.001 to 2 parts by weight, based on 100 parts by weight of the polyester.

Compositions

The compositions of this invention are made from the above ingredients.

Versus 100 parts by weight thermoplastic polyester (a), 1 to 15, specifically 1 to 10 or 5 to 15 parts by weight, preferably 6 to 13 parts by weight and more preferably 7 to 12 parts by weight (b) polycarbonate can be included. If (b) polycarbonate is included within these ranges, the compositions maintain good heat resistance and flow properties while obtaining high dimensional stability. Alternatively, an aromatic copolyester carbonate can be used to replace all or a part of the polycarbonate.

If less than these ranges, the effect of adding polycarbonate is little, and the desired surfaces on the molded items cannot be obtained due to defective release from the mold. Also if greater than these ranges, gas is given off during molding, and clouding and whitening of the surfaces occurs.

In one embodiment, no finely powdered filler is present in the composition. Alternatively, up to 2 wt. %, based on the weight of the polyester, is present. Also, versus 100 parts by weight thermoplastic polyester (a), 0.05 to 0.5 parts by weight, preferably 0.1 to 0.4 parts by weight and more preferably 0.15 to 0.3 parts by weight (c) finely powdered (particulate) filler can, or in some instances, should be included. If (c) finely powdered filler is included within these ranges, the compositions tend to have superior heat resistance and dimensional stability.

Also, versus 100 parts by weight thermoplastic polyester (a), 0.2 to 0.7 parts by weight, and preferably 0.3 to 0.6 parts by weight (d) montanic acid salt or montanic acid ester should be included. If (d) montanic acid salt or montanic acid ester is included within these ranges, one does not have the resin giving out gassing during molding and degradation of the gloss by out gassing at the vapor deposited surface after thermal aging, and good mold release behavior is provided.

Versus 100 parts by weight thermoplastic polyester (a), 0.05 to 0.5 parts by weight, preferably 0.1 to 0.4 parts by weight and more preferably 0.2 to 0.3 parts by weight (e) inorganic phosphorus compound should be included. If (e) inorganic phosphorus compound is included within these ranges, out gassing are suppressed without degrading heat resistance, thereby obtaining molded items that have superior surface gloss which does not change even when exposed to heat.

Molded articles that are molded using the above resin compositions of this invention possess little mold shrinkage during molding; the gloss of the molded surfaces is good; there is no residue on the mold after long molding runs; and there is no clouding or rainbow patterns or iridescence on direct metallized surface even after heat treatment.

Because of this, reflectors that are manufactured by metallization, for example direct vapor deposition, using molded items made from the compositions of this invention possess good appearance, heat resistance, and thermal stability.

Preparation of Compositions

The polyester resin compositions of this invention can be prepared by blending or kneading the above ingredients. This blending and kneading can be performed using commonly used methods, such as those using, for example, ribbon blenders, Henschel mixers, Banbury mixers, drum tumblers, single screw extruders, twin screw extruders, cokneaders, multiscrew extruders, etc. The temperature when kneading is usually selected from the range of 230 to 300° C.

Articles can then be shaped, extruded, calendared, or molded from the compositions. In particular, various known molding methods can be used, for example, injection molding, gas assist injection molding, vacuum molding, compression molding, rotary molding, and the like. An optional base coat can be applied to a surface of the article, followed by metallization of the surface. Vacuum metallization is often used, which as used herein includes both vacuum deposition and vacuum sputtering processes.

Optical Reflectors

Optical reflectors according to this invention are made from molding of the above polyester resin compositions.

This invention relates to resin compositions that can be used for optical reflectors and their applications that can be used for automotive headlamps, headlight extensions and headlamp reflectors, for indoor illumination, for vehicle interior illumination and for the like.

The molding methods are not particularly limited, but various known molding methods can be listed, for example, injection molding, gas assist injection molding, vacuum molding, extrusion, compression molding, calendaring, rotary molding, etc. Of these, molding is usually carried out by injection molding.

The optical reflectors of this invention can be obtained by performing metal vapor deposition on the surfaces of molded items made from polyester resin compositions, and forming metal layers. As a method for metal vapor deposition, one can list, for example, the method of vaporizing metal in a vacuum, adhering and solidifying this vapor on the surface of the molded item, and forming a metallic thin film. Sputtering processes can also be used.

It is preferable to form the metal film directly on the molded item surface without forming an undercoat. The surfaces of the above molded items are smooth and good gloss can be obtained even by direct metal vapor deposition without treating the molded item with primer. Moreover, because the release properties of the molded item during injection molding are good, the surface properties of the molded item are superior without replication of mold unevenness. Also, because the compositions of this invention are a special blend, mold release behavior is excellent and the adhesion of the formed metallic layers is high.

Chrome, nickel, aluminum, etc. can be listed as examples of vaporizing metals. Aluminum vapor deposition is preferable as metal vapor deposition. The surface of the molded item can be cleaned and degreased before vapor deposition in order to increase adhesion.

Thusly obtained optical reflectors have little mold shrinkage, have good surface gloss even when metal layers are directly vapor deposited, and the vapor deposited surfaces do not become cloudy or have rainbow patterns even on heating of the vapor deposited surface.

In particular, an article molded from the compositions, specifically a composition having up to 2 wt. % of a particulate filler, or no filler, has no surface defects visible to the eye on a surface thereof.

In another embodiment there is provided an article formed from the compositions, specifically a composition having up to 2 wt. % of a particulate filler, no filler, and having a metallized surface, wherein the metallized surface retains 90% or more of its gloss after heat aging at 150° C. for 1 hour, measured at 20 degrees using a micro tri gloss meter. A base coat (undercoat) can be present between the article and the metallized surface, or a surface of the article can be directly metallized.

In another embodiment there is provided an article formed from the compositions, specifically a composition having up to 2 wt. % of a particulate filler, or no filler, and having a metallized surface, wherein the metallized surface retains 95% or more of its gloss after heat aging at 150° C. for 1 hour, measured at 20 degrees using a micro tri gloss meter. An undercoat can be present between the article and the metallized surface, or a surface of the article can be directly metallized.

In another embodiment there is provided an article formed from the compositions, specifically a composition having up to 2 wt. % of a particulate filler, or no filler, and having a metallized surface, wherein the metallized surface retains 85% or more of its gloss after heat aging at 160° C. for 1 hour, measured at 20 degrees using a micro tri gloss meter. An undercoat can be present between the article and the metallized surface, or a surface of the article can be directly metallized.

In another embodiment there is provided an article formed from the compositions, specifically a composition having up to 2 wt. % of a particulate filler, or no filler, and having a metallized surface, wherein the metallized surface retains 88% or more of its gloss after heat aging at 160° C. for 1 hour, measured at 20 degrees using a micro tri gloss meter. An undercoat can be present between the article and the metallized surface, or a surface of the article can be directly metallized.

EXPERIMENTAL EXAMPLES

This invention is explained below with experimental examples, but this invention is not limited to these experimental examples alone.

The ingredients used in the experimental examples are the following.

Polybutylene terephthalate (PBT): GE Plastics 195, 315
Polycarbonate (PC): GE Plastics 105
Talc: IMIFABI, HTP Ultra5C (average grain size 0.5 μm)
Sodium montanate: Clariant Japan (Ltd), Licomont NaV101
Pentaerythritol terephthalate: FACI, PET S
Sodium stearate: Kanto Chemical Co. Inc., sodium stearate
Modified silicon oil: GE Toshiba Silicone Co., Ltd., TSF437
Glycerol mono stearate: Riken Vitamin Co. Ltd., Rikemal S100A
Poly alpha-olefin: BP Amoco Chemical, Durasyn 166
Stabilizer: Great Lakes Chemical, ANOX20
Zinc phosphate compound: Chemische Fabrik Budenheim, mono-zinc phosphate
Organophosphorus compound: Clariant Japan Ltd, P-EPQ Reference Examples 1 to 6

In order to select the mold release agent, the ingredients in the proportions shown in Table 1 were mixed, extruded through a twin-screw extruder set at 250° C., 200 rpm and 100 kg/h, and made into pellets. The pellets were dried and 100×60×3 mm flat molded items and samples for property measurements were obtained by injection molding.

Molding was carried out using mirror surface molds and the molded item surfaces visually evaluated using the scale below.

O: Absolutely no streaking or embossing of composition; good surface gloss

▲: Poor surface gloss due to streaking in portions and embossing of composition, etc.

X: Poor surface gloss due to streaking over entire surface, embossing of composition, etc.

After molding, the molded items were also aged 24 hours in an oven at 160° C., and the molded item surfaces visually evaluated using the scale below.

O: No visible whitening and no change in surface gloss

▲: Some whitening and clouding apparent due to out gassing, etc.

X: Entire surface whitened and clouded due to out gassing, etc.

The results are shown in Table 1.

TABLE 1

| | | Ref Ex 1 | Ref Ex 2 | Ref Ex 3 | Ref Ex 4 | Ref Ex 5 | Ref Ex 6 |
|---|---|---|---|---|---|---|---|
| Composition Parts by Weight | Polybutylene terephthalate | 100 | 100 | 100 | 100 | 100 | 100 |
| | Polycarbonate | 11 | 11 | 11 | 11 | 11 | 11 |
| | Talc | 0.14 | 0.14 | 0.14 | 0.14 | 0.14 | 0.14 |
| | Sodium montanate | 0.3 | | | | | |
| | Pentaerythritol terephthalate | | 0.3 | | | | |
| | Sodium stearate | | | 0.3 | | | |
| | Modified silicone oil | | | | 0.3 | | |
| | GMS | | | | | 0.3 | |
| | Poly alpha-olefin | | | | | | 0.3 |
| | Stabilizer | 0.07 | 0.07 | 0.07 | 0.07 | 0.07 | 0.07 |
| | Zinc phosphate compound | 0.2 | 0.2 | 0.2 | 0.2 | 0.2 | 0.2 |
| Properties | Molded surface | ○ | ○ | X | X | ▲ | ○ |
| | Surface after 160 C. ageing | ○ | X | X | X | ▲ | X |

From Table 1, it can determined that, by using montanic acid salt or ester, the molded surface has superior gloss, and this gloss does not change even under exposure to high temperature.

Working Examples 1 and 2

The ingredients in the proportions shown for Reference Examples 1 to 4 in Table 1 were mixed, extruded through a twin-screw extruder set at 250° C., 200 rpm and 100 kg/h, and made into pellets. The pellets were dried and 100×60×3 mm flat molded items and samples for property measurements were obtained by injection molding.

Molding was carried out using mirror surface molds, and the surfaces of the molded parts, that were directly vapor deposited with 0.9 μm thick aluminum without applying an undercoat, were visually evaluated using the scale below.

O: Absolutely no streaking or embossing of composition; good surface gloss

▲: Poor surface gloss due to streaking in portions and embossing of composition, etc.

X: Poor surface gloss due to streaking over entire surface, embossing of composition, etc.

After molding, the molded items were also aged 24 hours in an oven at 160° C., and the molded item surfaces visually evaluated using the scale below.

O: No visible whitening and no change in surface gloss

▲: Some whitening and clouding apparent due to out gassing, etc.

X: Entire surface whitened and clouded due to out gassing, etc.

The Vicat temperature was tested according to ISO306. Also, mold shrinkage was measured using ISO tensile dumbbells.

The results are shown in Table 2.

TABLE 2

| | | Work Ex 1 | Work Ex 2 | Comp Ex 1 | Comp Ex 2 | Comp Ex 3 | Comp Ex 4 |
|---|---|---|---|---|---|---|---|
| Composition PBW | Polybutylene terephthalate | 100 | 100 | 100 | 100 | 100 | 100 |
| | Polycarbonate | 9 | 11 | | 11 | 18 | 11 |
| | Talc | 0.16 | 0.14 | 0.13 | | 0.4 | 0.14 |
| | Sodium montanate | 0.5 | 0.3 | 0.3 | 0.5 | 0.8 | 0.3 |
| | Organophosphate compound | | | | | | 0.2 |
| | Zinc phosphate compound | 0.2 | 0.2 | | 0.2 | 0.2 | |
| | Stabilizer | 0.07 | 0.07 | 0.07 | 0.07 | 0.07 | 0.07 |
| Properties | Vicat (deg C.) | 176 | 171 | 185 | 160 | 156 | 162 |
| | Mold shrinkage (%) | 2.2 | 2.2 | 2.6 | 2.1 | 2.0 | 2.2 |
| | Molded surface | ○ | ○ | ▲ | ▲ | X | X |
| | Surface after 160 C. ageing | ○ | ○ | ○ | ▲ | X | X |

By using the compositions of this invention, one can obtain optical reflectors for which the mold shrinkage is suppressed, heat resistance is high and surface gloss is excellent, while not having changes in the surface state even when exposed to high temperature.

Example A and Comparative Examples B-E

The following Examples illustrate the advantage of using a montanic acid salt in a formulation without filler, and which on direct metallization can exhibit high metallized gloss retention on heat treatment. In all of the following examples, sample formulations throat-fed and extruded on CL5 (twin screw, 30 mm diameter), with the following temperature profile (rear to front): 400, 450, 500, 500, 500° F. (204, 232, 260, 260, 260, 260° C.). Die temperature was 500° F. (260° C.), with an RPM of 100 and vacuum of 30 pounds per square inch (psi) (0.207 MegaPascal (MPa)). Approximate Q (master rate)=300 lb/hr (136 kg/hr), N (screw speed)=410 rpm, target melt volume rate (MVR (250° C., 2.16 Kg, 240 second dwell time)=30 cc/10 minutes.

Compounded pellets were dried for 3-4 hours at 250° F. (121° C.) in an air-circulating oven prior to molding. A van Dorn injection-molding machine was used with following temperature profile (rear to front): 554, 570, 570, 590° F. (290, 299, 299, 310° C.). Typical settings were as follows: 100 rpm screw speed, 600 psi (4.13 MPa) hold pressure, 75 psi (0.52 MPa) back pressure, and 30 sec cycle times. Temperatures at the front of the barrel and hold/back pressures were adjusted to accommodate differences in the processability between formulations. All standard parts were 0.125" (3.18 mm) thick. 4 inch×4 inch (10. cm×10.2 cm) plaques were molded using high polish steel tool. The high polish tool was used so as to get a high gloss class "A" surface finish.

Each standard test method was carried out on five 0.125 inch (3.18 mm) parts. Heat deflection temperature (264 psi (1.82 MPa) and 66 psi (0.455 MPa), unannealed), was measured in accordance with ASTM D648; Izod impact (notched and unnotched, 2 and 5 ft-lb hammer respectively, was measured in accordance with ASTM D256); flex modulus and stress at break were measured in accordance with ASTM D790; and Type I tensile modulus and stress at break were measured in accordance with ASTM D638, all at 25° C.

To determine gloss before and after heating, 4 inch×4 inch (10. cm×10.2 cm) plaque molded plaques were metallized using a standard metallization process that involved a standard aluminum vacuum coat followed by a standard plasma topcoat. Metallized gloss measurements were carried out using a BKY Gardner micro-tri-gloss instrument. Measurements were recorded at 20 degrees. All plaques prior to heat treatment exhibited high metallized gloss at 20 degree measurements (1750-1780 units). 4"×4" metallized plaques were then subjected to 150° C. for one hour. The plaques were removed from the oven and visually inspected for surface quality.

Example A, which is in accordance with the present invention, comprises the following components, wherein amounts are in weight percent, based on the total weight of the formulation.

Resin: Poly(butylene terapthalate) (PBT) (98%), obtained from GE Plastics

Stabilizer: Hindered Phenol (0.06%), obtained from Ciba

Mold release agent: LICOMONT NAV101 from Clariant (0.3-0.5%)

Colorants: TiO$_2$ (1.32%); carbon black (0.0018%), Pigment yellow 53 (0.03%) chromium oxide (0.0075%)

The plaques exhibited low ejection pressures during the molding process. Articles (plaques) molded from composition had the properties shown in Table 3.

For comparative Example B, the procedure of Example A was repeated, except that instead of the composition described in Example A, a PBT composition obtained from DuPont under the trade name CRASTIN-CE2055 was used. The composition included PBT and stabilizers. Experiments showed that the composition did not have any salts derived from montanic acid.

TABLE 3

| Properties | Units | Example 1 |
| --- | --- | --- |
| Flexural Modulus | MPa | 2550 |
| Flex Stress at 5% Strain | MPa | 85.0 |
| Flexural Stress at Yield | MPa | 87.9 |
| Deflection temp 266 psi | ° C. | 52.7 |

TABLE 3-continued

| Properties | Units | Example 1 |
| --- | --- | --- |
| Deflection temp- 66 psi | ° C. | 159 |
| Impact Strength 23, N | J/M | 48.0 |
| Energy to max load | J | 30.5 |
| Energy to failure | J | 56.3 |
| Energy, Total | J | 57.2 |
| Max Load | kN | 4.300 |
| Deflection at max load | mm | 13.5 |
| Mold shrinkage parallel | % | 2.17 |
| Mold shrinkage perpendicular | % | 2.12 |
| Modulus of Elasticity | MPa | 2590 |
| Stress at Yield | MPa | 57.5 |
| Stress at Break | MPa | 53.2 |
| Elongation at Yield | % | 3.7 |
| Elongation at Break | % | 18.6 |
| MVR ASTM 250C, 2.16 Kg, 360 s | | 30.2 |
| MVR ISO 250C, 2.16 kg, 240 s | | 29.80 |

For comparative Example C, the procedure of Example A was repeated except that instead of the composition described in Example A, a PBT composition obtained from Degussa under the trade name VESTADOR was used. The composition included PBT and stabilizers. Experiments showed that the composition did not have any salts derived from montanic acid.

Gloss retention results for Examples A, B, and C are shown in Table 4.

TABLE 4

| 20 degree Gloss | Example A | Example B | Example C |
| --- | --- | --- | --- |
| Initial | 1779 | 1767 | 1737 |
| After 1 hour at 150° C. | 1741 | 1537 | 1492 |
| Gloss retention (%) | 98 | 87 | 86 |
| After 1 hour at 160° C. | 1607 | 1427 | 1350 |
| Gloss retention (%) | 90 | 81 | 78 |

The plaques made from Example A showed very little change in metallized gloss after heat treatment (Table 3). A similar trend was also observed when metallized plaques were tested at 160° C. for one hour. The article exhibited low ejection pressures during the molding process.

For comparative Example D, the procedure of Example A was repeated except that instead of the composition described in Example A, polycarbonate was added in an amount of 10 wt. %. LICOMONT NAV101 was present in an amount of 0.5 wt. %.

Gloss retention results for Examples A and D are shown in Table 5.

TABLE 5

| 20 deg Gloss | Example A | Example D |
| --- | --- | --- |
| Initial | 1779 | 1755 |
| 1 hr at 150° C. | 1741 | 1197 |
| Gloss retention (%) | 98 | 68 |

The above results show that plaques made from the polycarbonate-containing composition (Example D) exhibited poor gloss retention properties. It was further observed that the heat-treated metallized articles (plaques) of Example D turned extremely hazy, and showed high iridescence when the articles were heated at 150° C. for one hour.

For comparative Example E, the procedure of Example 1 was repeated using the same composition as Example A, but without any montanic acid or derivative thereof, and the composition was molded into parts (cup tools). However, the cup tools cracked The cracked parts showed the following gloss retention properties (Table 6).

TABLE 6

| 20 degree Gloss | Example A | Example E |
|---|---|---|
| Initial | 1779 | 1775 |
| After 1 hour at 150° C. | 1741 | 1718 |
| Gloss retention (%) | 98 | 97 |

The above results show that use of montanic acid or a salt thereof can also contribute to improvements in part ejection and cycle time, as well as high gloss retention.

The singular forms "a", "an" and "the" include plural referents unless the context clearly dictates otherwise. All amounts and ranges disclosed herein are inclusive of the recited endpoints, and the endpoints are independently combinable with each other. All references are incorporated herein by reference in their entirety.

While the invention has been illustrated and described in typical embodiments, it is not intended to be limited to the details shown, since various modifications and substitutions are possible without departing from the spirit of the present invention. As such, modifications and equivalents of the invention herein disclosed may occur to persons skilled in the art using no more than routine experimentation, and all such modifications and equivalents within the spirit and scope of the invention as defined by the following claims.

The invention claimed is:

1. An article having a metallized surface formed by vacuum metallization comprising an extruded composition comprising:
   a. a thermoplastic polyester selected from the group consisting of polyethylene terephthalate, polybutylene terephthalate, polyethylene naphthalate, polybutylene naphthalate, polytrimethylene terephthalate, poly(1,4-cyclohexylenedimethylene 1,4-cyclohexanedicarboxylate), poly(1,4-cyclohexylenedimethylene terephthalate), poly(cyclohexylenedimethylene-co-ethylene terephthalate), and combinations thereof;
   and based on 100 parts by weight of the polyester,
   b. 5 to 15 parts by weight of a polycarbonate, wherein the polycarbonate comprises a carbonate component and a diphenol component, wherein said diphenol component is selected from the group consisting of 2,2-bis(4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)decane, 1,4-bis(4-hydroxyphenyl)propane, 1,1-bis(4-hydroxyphenyl)cyclododecane, 1,1-bis(3,5-dimethyl-4-hydroxyphenyl)cyclododecane, 4,4-dihydroxyldiphenylether, 4,4-thiodiphenol, and 4,4-dihydroxy-2,5-dihydroxydiphenylether, and combinations thereof;
   c. 0.05 to 0.5 parts by weight of an inorganic phosphorous compound;
   d. 0.2 to 0.7 parts by weight of an alkali metal salt, an alkaline earth metal salt, and/or a $C_{1-12}$ ester of an aliphatic $C_{24-36}$ carboxylic acid;
   e. 0.05 up to 2 parts by weight of particulate filler, wherein the particulate filler has an average particle size less than or equal to 10 µm; and optionally,
   f. 0.001 to 2 parts by weight of a colorant;

wherein the metallized surface retains 90% or more of its gloss after heat aging at 150° C. for 1 hour, measured at 20 degrees using a micro tri gloss meter.

2. The article of claim 1, further comprising a base coat disposed between a surface of the article and a metallized layer.

3. The article of claim 2, having no surface defects visible to the eye on a surface thereof.

4. The article of claim 1, wherein there is an absence of a base coat disposed between a surface of the article and a metallized layer.

5. The article of claim 4, having no surface defects visible to the eye on a surface thereof.

6. The article of claim 1, wherein the article is in the form of a component of a headlamp.

7. The article of claim 6, wherein the article is in the form of a headlamp reflector.

8. The article of claim 1, wherein the metallized surface retains 95% or more of its gloss after heat aging at 150° C. for 1 hour, measured at 20 degrees using a micro tri gloss meter.

9. The article of claim 1, wherein the metallized surface retains 85% or more of its gloss after heat aging at 160° C. for 1 hour measured at 20 degrees using a micro tri gloss meter.

10. The article of claim 1, wherein the metallized surface retains 88% or more of its gloss after heat aging at 160° C. for 1 hour measured at 20 degrees using a micro tri gloss meter.

11. A method of forming a metallized article, comprising shaping, extruding, calendaring, or molding a composition to form the article and metallizing a surface of the article, wherein the composition of the metalized article comprises a combination of:
   a. a thermoplastic polyester selected from the group consisting of polyethylene terephthalate, polybutylene terephthalate, polyethylene naphthalate, polybutylene naphthalate, polytrimethylene terephthalate, poly(1,4-cyclohexylenedimethylene 1,4-cyclohexanedicarboxylate), poly(1,4-cyclohexylenedimethylene terephthalate), poly(cyclohexylenedimethylene-co-ethylene terephthalate), and combinations thereof;
   and based on 100 parts by weight of the polyester;
   b. 1 to 15 parts by weight of a polycarbonate, wherein the polycarbonate comprises a carbonate component and a diphenol component, wherein said diphenol component is selected from the group consisting of 2,2-bis(4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)decane, 1,4-bis(4-hydroxyphenyl)propane, 1,1-bis(4-hydroxyphenyl)cyclododecane, 1,1-bis(3,5-dimethyl-4-hydroxyphenyl)cyclododecane, 4,4-dihydroxyldiphenylether; 4,4-thiodiphenol, and 4,4-dihydroxy-2,5-dihydroxydiphenylether, and combinations thereof;
   c. 0.05 to 0.5 parts by weight of an inorganic phosphorous compound; and 0.2 to 0.7 parts by weight of an alkali metal salt, an alkaline earth metal salt, and/or a $C_{1-12}$ ester of an aliphatic $C_{24-36}$ carboxylic acid,
   d. 0.05 to 2 parts by weight of a particulate filler, wherein the particulate filler has an average particle size of less than or equal to 10 µm; and optionally,
   e. 0.001 to 2 parts by weight of a colorant;
wherein the metallized surface by retains 90% or more of its gloss after heat aging at 150° C. for 1 hour, measured at 20 degrees using a micro tri gloss meter.

12. The method of claim 11, wherein the metallizing is vacuum metallizing.

13. The method of claim 12, further comprising disposing a base coat on a surface of the article before metallizing the base-coated surface.

14. The method of claim 12, further comprising not disposing a basecoat on a surface of the article before metallizing the surface.

15. A composition comprising a combination of
   a. a thermoplastic polyester selected from the group consisting of polybutylene terephthalate, polyethylene naphthalate, polybutylene naphthalate, polytrimethylene terephthalate, poly(1,4-cyclohexylenedimethylene 1,4-cyclohexanedicarboxylate), poly(1,4-cyclohexylenedimethylene terephthalate), poly(cyclohexylenedimethylene-co-ethylene terephthalate), and combinations thereof;
   and based on 100 parts by weight of the thermoplastic polyester;
   b. 1 to 15 parts by weight of a polycarbonate, wherein the polycarbonate comprises a carbonate component and a diphenol component, wherein said diphenol component is selected from the group consisting of 2,2-bis(4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl) cyclohexane, 1,1-bis(4-hydroxyphenyl)decane, 1,4-bis (4-hydroxyphenyl)propane, 1,1-bis(4-hydroxyphenyl) cyclododecane, 1,1-bis(3,5-dimethyl-4-hydroxyphenyl)cyclododecane, 4,4-dihydroxyldiphenylether, 4,4-thiodiphenol, 4,4-dihydroxy-2,5-dihydroxydiphenylether, and combinations thereof;
   c. 0.05 to 0.5 parts by weight of an inorganic phosphorous compound;
   d. 0.2 to 0.7 parts by weight of an alkali metal salt, an alkaline earth metal salt, and/or a $C_{1-12}$ ester of an aliphatic $C_{23-36}$ carboxylic acid;
   e. 0.05 to 2 parts by weight of particulate filler, wherein the particulate filler has an average particle size less than or equal to 10 mm; and optionally,
   f. 0.001 to 2 parts by weight of a colorant;
wherein a metallized surface formed by vacuum metallization and deposited directly on an article that is injection molded from the composition retains 90% or more of its gloss after heat aging at 150° C. for 1 hour, measured at 20 degrees using a micro tri gloss meter.

16. The composition of claim 15, wherein the salt is an alkali metal and the carboxylic acid is a $C_{26-36}$ carboxylic acid.

17. The composition of claim 15, wherein the alkali metal is sodium and the carboxylic acid is a $C_{26-36}$ carboxylic acid.

18. The composition of claim 15, wherein the ester is a $C_{2-10}$ alkyl ester of the $C_{26-36}$ aliphatic carboxylic acid.

19. The composition of claim 15, wherein the polycarbonate comprises units derived from 2,2-bis(4-hydroxyphenyl) propane and the thermoplastic polyester is polybutylene terephthalate.

20. The composition of claim 15, wherein particulate filler consists of 0.05 to 0.5 parts by weight of talc.

21. The composition of claim 15, wherein the particulate filler has a water content of less than 0.25 weight percent.

22. The composition of claim 15, wherein the diphenol component is selected from the group consisting of 2,2-bis (4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,4-bis (4-hydroxyphenyl)propane, 1,1-bis(4-hydroxyphenyl)cyclododecane, and combinations thereof.

23. The composition of claim 15, comprising, based on 100 parts by weight of the thermoplastic polyester;
   a. 6 to 13 parts by weight of the polycarbonate;
   b. 0.1 to 0.4 parts by weight of the inorganic phosphorous compound;
   c. 0.3 to 0.6 parts by weight of the alkali metal salt, the alkaline earth metal salt, and/or the $C_{1-12}$ ester of the aliphatic $C_{24-36}$ carboxylic acid; and
   d. 0.1 to 0.4 parts by weight of the particulate filler.

24. The composition of claim 15, comprising, based on 100 parts by weight of the thermoplastic polyester;
   a. 7 to 12 parts by weight of the polycarbonate;
   b. 0.2 to 0.3 parts by weight of the inorganic phosphorous compound; and
   c. 0.3 to 0.6 parts by weight of the alkali metal salt, the alkaline earth metal salt, and/or the $C_{1-12}$ ester of the aliphatic $C_{24-36}$ carboxylic acid; and
   d. 0.14 to 0.3 parts by weight of the particulate filler.

25. The composition of claim 15, wherein the inorganic phosphorous compound is selected from the group consisting of phosphoric acid, phosphorous acid, metal salts of phosphoric acid, hydrates of metal salts of phosphoric acid, metal salts of phosphorous acid, and combination thereof; the alkali metal salt, the alkaline earth metal salt, and/or the $C_{1-12}$ ester of the aliphatic $C_{24-36}$ carboxylic acid is selected from the group consisting of montanic acid salts, montanic acid esters, and combinations thereof; and the particulate filler is selected from the group consisting of mica, potassium titanate whiskers, kaolin, clay, talc, wollastonite, and combinations thereof.

26. The composition of claim 15, wherein the inorganic phosphorous compound is selected from the group consisting of zinc phosphate, potassium phosphate, sodium phosphate, aluminum phosphate, sodium pyrophosphate, the hydrates thereof, and combinations thereof; and the alkali metal salt, the alkaline earth metal salt, and/or the $C_{1-12}$ ester of the aliphatic $C_{24-36}$ carboxylic acid is selected from the group consisting of sodium montanate, potassium montanate, beryllium montanate, magnesium montanate, calcium montanate, lithium montanate, aluminum montanate, and combinations thereof.

27. The composition of claim 15, wherein the inorganic phosphorous compound is zinc phosphate; the alkali metal salt, the alkaline earth metal salt, and/or the $C_{1-12}$ ester of the aliphatic $C_{24-36}$ carboxylic acid is sodium montanate; and the particulate filler is talc.

28. The composition of claim 15, wherein the inorganic phosphorus compound is a phosphate salt.

* * * * *